G. H. WELLS.
Gas-Purifier.
No. 163,706.
Patented May 25, 1875.
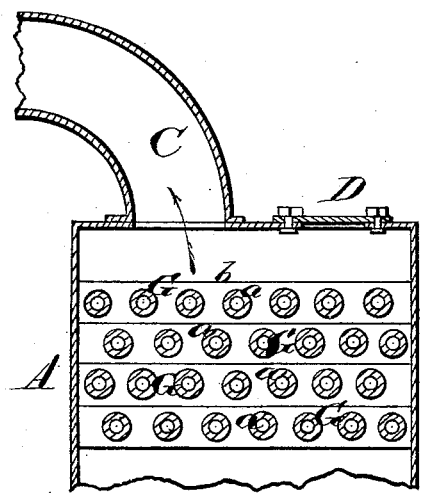
Fig. 1
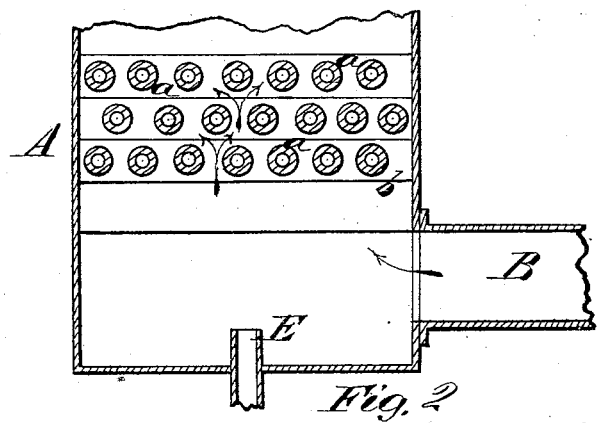
Fig. 2
WITNESSES
INVENTOR
G. H. Wells
ATTORNEYS

UNITED STATES PATENT OFFICE.

GEORGE H. WELLS, OF NASHVILLE, TENNESSEE.

IMPROVEMENT IN GAS-PURIFIERS.

Specification forming part of Letters Patent No. 163,706, dated May 25, 1875; application filed April 24, 1875.

*To all whom it may concern:*

Be it known that I, GEORGE H. WELLS, of Nashville, in the county of Davidson and State of Tennessee, have invented a new and valuable Improvement in Gas-Scrubber Grids; and I do hereby declare that the following is a full, clear, and exact description of the construction and operation of the same, reference being had to the annexed drawings making a part of this specification, and to the letters and figures of reference marked thereon.

Figure 1 of the drawings is a representation of a transverse section of my device, and Fig. 2 is a side view of the same.

This invention relates to means for purifying illuminating-gas, for the purpose of depriving it of its ammoniacal liquors and tarry matters; and the nature of my invention consists in a novel arrangement of sectional grids in a vessel, through which the gas is caused to pass, which grids are composed of round rods of cane or other similar material, between and over which the gas is caused to pass, dividing the gas into fine streams, and causing it to deposit its tarry matter and ammoniacal liquors, as will be understood from the following description.

Heretofore wooden grids have been experimented with, the outer surfaces of the grids being varnished or enameled, to render them smooth; but such grids have been found inoperative, because the gases destroy this varnished or enameled surface or covering. Ordinary wooden grids are objectionable, on account of the tarry matter in the gas adhering to them.

My improvement entirely removes these objections, owing to the smooth and glassy surface of the cane-rods employed.

In the annexed drawings, A designates a vessel, of rectangular form, and of any suitable capacity, which is preferably made of sheet-iron. B designates a pipe for admitting gas into vessel A at its base, and C is a pipe for the escape of the purified gas from the upper end of the vessel A. D is a man-hole on top of vessel A, and E is a pipe for drawing off impurities, which are deposited in the bottom of vessel A. Inside of vessel A I apply a number of grids, G, which are composed of round rods $a$, arranged parallel to each other at suitable distances apart, and secured to end pieces $b\ b$. These grids are made of sections, small enough to pass through the man-hole D, and large enough to completely fill up the vessel A when adjusted in tiers one upon the other.

It is important that the rods $a$ be arranged as shown in Fig. 1—that is to say, the rods of one tier are arranged directly above the spaces of the adjacent tiers.

By this arrangement the ascending volume of gas is broken up into small streams at each grid, and the tarry matter and ammoniacal liquors are deposited on the rods, and drip from grid to grid, thereby washing, cooling, "scrubbing," and condensing the gas with its own liquor, and retaining in the gas its carbon and illuminating power.

I prefer to use cane found in the southern swamps, because of its peculiar nature, it having a great attraction for moisture, and, as it is round and smooth, it prevents the apparatus from choking.

What I claim as new, and desire to secure by Letters Patent, is—

1. A gas-scrubber, composed of cane rods or other similar material, substantially for the purpose herein described.

2. In a gas-purifier, a series of sectional grids, composed of cane rods or other similar material, substantially as and for the purpose set forth.

In testimony that I claim the above I have hereunto subscribed my name in the presence of two witnesses.

GEORGE HENRY WELLS.

Witnesses:
GEO. W. LEE,
W. M. CARROLL.